US006287383B1

(12) United States Patent
Biro et al.

(10) Patent No.: US 6,287,383 B1
(45) Date of Patent: Sep. 11, 2001

(54) TEXTURING AND PREFERENTIAL PAINTING PROCESS FOR VERTICAL AND HORIZONTAL BLINDS

(75) Inventors: Michael Julius Biro; Walter Biro, both of Boca Raton; David Swinscoe, Fort Lauderdale, all of FL (US)

(73) Assignee: Isoteck Corporation, Pompano Beach, FL (US)

( * ) Notice: Subject to any disclaimer, the term of this patent is extended or adjusted under 35 U.S.C. 154(b) by 0 days.

(21) Appl. No.: 09/383,562

(22) Filed: Aug. 26, 1999

Related U.S. Application Data

(62) Division of application No. 09/040,647, filed on Mar. 17, 1998, now Pat. No. 6,006,816.

(51) Int. Cl.[7] .......... B29C 47/06; B05B 13/02

(52) U.S. Cl. .......... 118/307; 118/313; 118/44; 118/211

(58) Field of Search .......... 118/200, 206, 118/209, 211, 212, 217, 216, 223, 224, 249, 255, 300, 305, 307, 304, 324, 326, 44; 160/166.1, 168.1, 236; 427/469, 479, 424

(56) References Cited

U.S. PATENT DOCUMENTS 5,284,693 * 2/1994 Spain et al. .......... 428/172
5,741,558 * 4/1998 Otani et al. .......... 427/469
5,800,615 * 9/1998 Lambert et al. .......... 118/326

FOREIGN PATENT DOCUMENTS

2119966 * 9/1994 (CA) .

* cited by examiner

*Primary Examiner*—Richard Crispino
*Assistant Examiner*—Yewebdar T. T.
(74) *Attorney, Agent, or Firm*—Ronald V. Davidge

(57) ABSTRACT

Extruded material for forming blind slats has at least one textured surface with raised areas and adjacent lower areas. After extrusion and texturing processes, the slat material is passed through a spray painting process applying a substantially thicker coating of paint to the raised areas than to the adjacent lower areas.

8 Claims, 7 Drawing Sheets

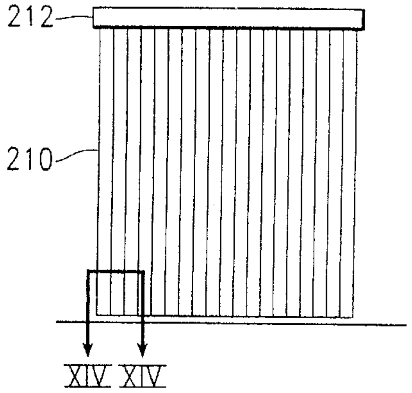
FIG. 13.
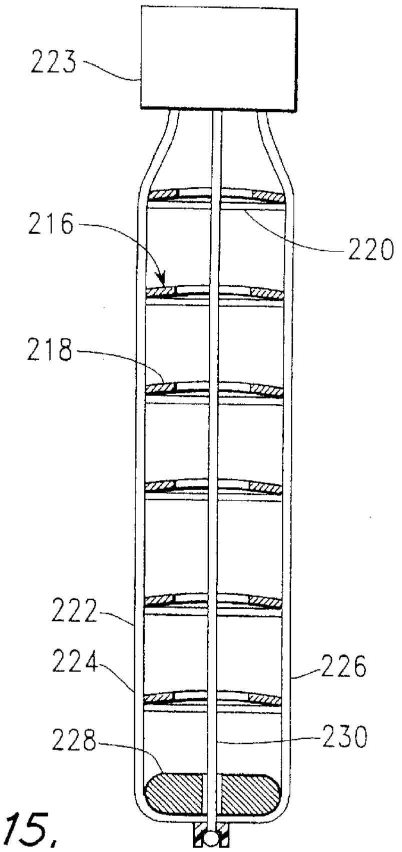
FIG. 15.
FIG. 14.
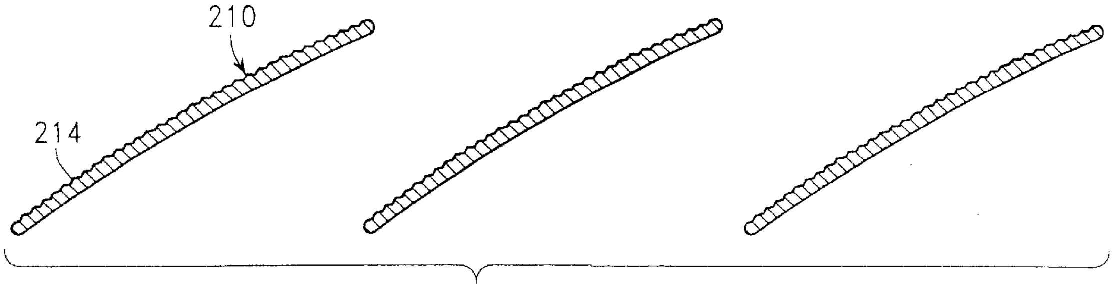

TEXTURING AND PREFERENTIAL PAINTING PROCESS FOR VERTICAL AND HORIZONTAL BLINDS

CROSS REFERENCE TO RELATED APPLICATIONS

This application is a division of U.S. patent application Ser. No. 09/040,647, filed Mar. 17, 1998, now issued as U.S. Pat. No. 6,006,816.

This application is also related to a co-pending U.S. patent application Ser. No. 08/970,851, filed Nov. 14, 1997, now issued as U.S. Pat. No. 6,015,002, the disclosure of which is herein incorporated by reference. This co-pending application describes a multi-layer slat for venetian blinds which is translucent, allowing light to shine into a room during the day, together with a coextrusion process for making such a slat.

BACKGROUND OF THE INVENTION

1. Field of the Invention

This invention relates to textured and painted slats for both vertical and horizontal window or door blinds, and, more particularly, to a method for preferentially coating textured surfaces of such slats with paint, so that the peaks or ridges are coated more heavily than surrounding surfaces.

2. Background Information

A highly desirable feature of horizontal and vertical blind slats is a well-defined, highly-visible surface texture, which differentiates the slats from the plain, sterile appearance generally associated with plastic blind slats. A conventional method for obtaining such a surface texture is through the use of a fabric material. A narrow strip of fabric may itself be used as a vertical blind slat, with a metal weight sewn into the strip at its bottom end being used to provide a measure of stability for the slat, which would otherwise be much too light in weight to hang straight or to resist excessive movement in air currents. Altemately, a fabric strip may be applied to one or both sides of a thermoplastic slat material, such as an extruded PVC strip, which provides weight and rigidity. The fabric may present an ordinary textile appearance, or its appearance may be enhanced by weaving in fibers of larger diameter and differing colors. One problem associated with the use of fabric in these ways is a high maintenance requirement caused by dust and dirt lodging in the fibers of the porous fabric material, resulting in blinds which are particularly difficult to clean. This problem can also result in a shortened practical life of the horizontal or vertical blinds, which eventually become impossible to clean effectively.

What is needed is a way to produce a visual effect of a well-defined, highly-visible surface texture on the surface of an extruded plastic strip, without a necessity for using a porous fabric overlay.

Translucence is an optical property which is highly desirable in window coverings to afford admission of sunlight into a room during the day without compromising privacy at night. Popular examples of translucent window coverings are found in shades using translucent fabric materials, which may be rolled up on a single roll at the top of a window, or which may be raised into a pleated or accordion fold as Roman shades. While such shades can be lowered to cover a window or raised to reveal a clear view, they are limited to presenting a rectangular translucent area; they cannot be partially opened to reveal slots through which the outside world may be viewed. On the other hand, horizontal or vertical blinds are variable louvered structures, which may be fully closed, fully open and drawn back, or partly open to present a number of slots through which the outside world may be viewed.

However, blinds are not available with translucent slats. Part of the reason for this is caused by the fact that blinds are typically exposed to very harsh ultraviolet energy, both from exterior sunlight and from interior fluorescent lighting. Slats for horizontal and vertical blinds are often composed of thermoplastic materials, such as PVC (polyvinyl chloride), which are available in clear or translucent forms. However, such materials are subject to severe discoloration when they are exposed to ultraviolet light, unless they include UV stabilizers. These UV stabilizers additionally turn a transparent material into a translucent material. However, when otherwise transparent PVC is loaded with sufficient UV stabilizers to achieve an adequate lifetime in use as a blind slat, and when such material is formed into a slat having a thickness sufficient to provide the rigidity needed in a blind application, the resulting slat is essentially opaque, lacking an ability to provide indoor lighting by transmitting outdoor light during daytime.

Therefore, what is needed is a slat for vertical or horizontal blinds having a combination of sufficient thickness for rigidity, sufficient UV stabilizers to prevent discoloration, optical translucence, and a well defined surface texture, which is clearly visible both under conditions of backlighting (as viewed from inside during the day) and front lighting (as viewed from inside during the night).

SUMMARY OF THE INVENTION

It is a first objective of the present invention to provide a method for enhancing textural features in the surface of an opaque blind slat, with such enhancement providing a difference in shade or color from surrounding areas.

It is a second objective of the present invention to provide a method for enhancing textural features in the surface of a translucent blind slat, with such enhancement providing a difference in opacity or color from surrounding areas.

It is a third objective of the present invention to provide a method for enhancing textural features in the surface of a translucent blind slat, with such enhancement providing a difference in opacity as the slat is back lighted and in shade as the slat is front lighted.

It is a fourth objective of the present invention to provide an inexpensive means for painting a texture pattern on an extruded plastic slat.

It is a fifth objective of the present invention to provide a means for painting a textured pattern which is dried without an application of heat following the extrusion process.

In accordance with one aspect of the invention there is provided a slat for a blind assembly, with the slat including an elongated section of slat material having an inner surface with a texture pattern having raised areas and adjacent lower areas, and a partial coating of paint on the inner surface, with the partial coating of paint having a substantially greater thickness on the raised areas than on the lower areas.

In accordance with another aspect of the invention, there is provided apparatus for producing a visibly enhanced textured surface on slat material extruded to form a slat for a blind assembly. This apparatus includes a texturing station and a painting station. The texturing station has a texturing roll turning in contact with a first surface to the slat material and a back-up roll turning in contact with a second surface of the slat material, with the second surface being opposite the first surface. A peripheral surface of the texturing roll has a surface pattern forming, on the first surface of the slat material, a texture pattern with raised areas and adjacent lower areas. The painting station, through which the slat material is moved after being moved through the texturing station, includes a nozzle spraying a mixture of air and paint droplets onto the first side of the slat material in a painting process configured to apply a substantially thicker coating of paint to the raised areas than to the adjacent lower areas.

BRIEF DESCRIPTION OF THE DRAWINGS

FIG. 13 is a front elevation of a vertical blind assembly including a number of slats of a type shown in FIGS. 1 or 8;

FIG. 14 is a fragmentary cross-sectional plan view of the vertical blind assembly of FIG. 11, taken as indicated by sectional lines XII—XII therein; and FIG. 15 is a cross-sectional end elevation of a horizontal blind assembly including a number of slats of the type shown in FIGS. 1 or 8.

DETAILED DESCRIPTION

Figure 1:
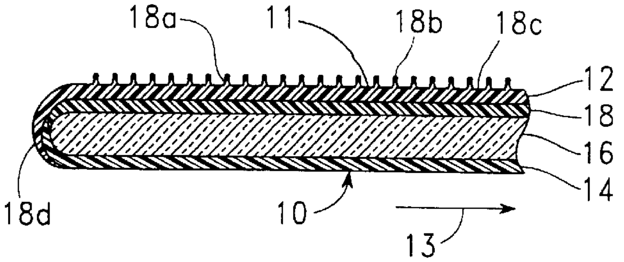
FIG. 1 is a fragmentary transverse cross-sectional view of a translucent slat made in accordance with an embodiment of the present invention to include a selectively painted textured surface.

FIG. 1 is a fragmentary transverse cross-sectional view of a slat 10, made in accordance with a first embodiment of the present invention, to include a selectively painted inner surface 11 on an innermost layer 12 of a number of coextruded layers. The width of slat 10 extends in the direction of arrow 13, with Its length, extending perpendicularly from the direction of arrow 13, being much greater than its width. This slat 10 includes the inside layer 12, which is preferably inwardly exposed (into a room) when the blind including the slat 10 are closed, and an outside layer 14, which is preferably correspondingly outwardly exposed when the blind is closed. A first base layer 16 and a second base layer 18 lie between the inside layer 12 and the outside layer 14. The inner surface 11 is textured to include a number of ridges or peaks **18*a*, on which paint droplets 18*b* are deposited. The portions 18*c* of the inner surface 11 between ridges or peaks 18*a*** have relatively little paint.

The inside layer 12, which is 0.08–0.18 mm (0.003–0.007 inch) thick, is preferably composed of a UV stabilized PVC material having pearlescent pigmentation, such as the material sold by the Geon Company as GEON 87654. The outer layer 14, which is 0.13–0.18 mm (0.005–0.007 inch) thick, is preferably composed of a semi-transparent UV stabilized PVC, such as GEON No. 1260. The first base layer 16, which is 0.25–0.51 mm (0.010–0.020) inch thick, is preferably composed of a clear PVC material, such as GEON No. 87727–002. The second base layer 18, which is 0.13–0.18 mm (0.005–0.007) inch thick, is composed, for example, of a UV stabilized PVC material having pearlescent pigmentation, such as GEON No. 87654. The UV stabilizing components serve to prevent transmission of ultra-violet rays through one layer into another.

In one version of the present invention, the inside layer 12 includes a P.20 to P.40 foaming agent, mixed with the PVC material at a ratio of 3 to 6 percent. This concentration of foaming agent, being insufficient to produce a structural foam product, produces a number of small gas pockets, some of which, being near the surface of the slat 10, cause the appearance of a matte finish on this surface, in place of the glossy finish generally characterizing the surface of a molded or extruded plastic part. The type of foaming agent and its concentration are determined according to the surface roughness desired in the finished product. In the example of FIG. 1, the small gas pockets produced by the foaming agent also contribute to a cloudy, translucent appearance desired when the slat 10 is illuminated with transmitted outdoor light.

While FIG. 1 shows a portion of the slat 10 adjacent to a longitudinal edge **18*d* thereof, it is understood that the opposite longitudinal edge of the slat has features similar to those shown in FIG. 1. In particular, the inside layer 12 and the outside layer 14 extend around the base layers 16, 18, overlapping at the rounded edge 18*d*. This configuration allows a relatively high concentration of pigments and UV stabilizers and in the layers 12, 14 to protect the base layers 16, 18 from discoloration which might otherwise occur if sunlight were allowed to enter these layers 12, 14 directly along the edge 18*d***. This feature of the present invention provides a significant advantage over the prior-art multilayer extruded slats of U.S. Pat. Nos. 4,877,077 and 5,119,871, both of which show an inner layer exposed along the edges of a slat. This feature is particularly significant as a part of the present invention, as it facilitates the use of one or more base transparent base layers which cannot otherwise be sufficiently protected from discoloration with UV exposure over time.

Figure 2:
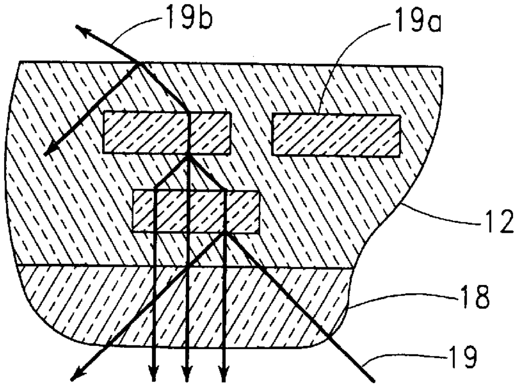
FIG. 2 is a schematic view of the internal transmission and reflection of light within an inside layer of the slat of FIG. 1.

FIG. 2 is a schematic cross-sectional view of the internal transmission and reflection of a light ray 19 in the inside layer 12, which includes a number of pearlescent pigment particles 19*a*. The light ray 19 enters the inside layer 12 from the second base layer 18, having traveled through the semi-transparent outside layer 14 and the transparent first base layer 16 (both shown in FIG. 1). Each time the ray 19 strikes a surface of a pigment particle 19*a*, a first portion of the ray is reflected, while a remaining second portion is refracted and transmitted. The transmitted portion eventually emerges as exiting ray 19*b*.

This figure is admittedly a schematic oversimplification of the structure of inside layer 12. In a preferred version of the present invention, this layer is 0.08 to 0.2 mm (0.003 to 0.007 in.) thick, being composed of a transparent PVC material filled with pearlescent pigment particles which, being configured particularly to produce a silvery-white appearance when viewed by reflected light, are composed of mica particles having a length of 5–25 $\mu$m and a thickness of 100–500 nm, coated with a layer to titanium oxide having a thickness of 40–60 nm. Thus, while the actual thickness of the pigment particles 19*a*, compared to the thickness of the layer 12, is much smaller than that shown in the figure, there are many more layers of pigment particles 19*a* within the layer 12 than shown in the figure.

Since the pearlescent pigment particles both transmit and reflect light, they are particularly desirable in the application of a layer of material being configured for overall translucence. With the alternative use of absorptive pigmentation, light rays striking pigment particles are simply absorbed. However, the layer of material including pearlescent pigmentation must be quite thin to provide a suitable level of translucence.

Referring again to FIG. 1, in its intended use, the slat 10 forms part of a horizontal or vertical blind for a window or door, being backlighted primarily by sunlight from outdoors during the day and being front lighted by artificial light from inside a room during the night. The textured inner surface 11 is directed into the room whenever the blind is closed. The artificial lighting is on the textured surface 11 is generally sufficiently non-uniform to produce shading of the textured features. Thus, in the absence of applied paint, under most conditions with front lighting, as at night, the textured pattern of inner surface 11 is readily apparent due to the shadows produced on the shaded sides of individual raised texture features 18*a* and on portions of the depressed surfaces 18*c* adjacent the shaded sides of individual raised texture features 18*a*. However, in the absence of applied paint, with backlighting from outdoor sunlight, the textured pattern tends to disappear, This is because the differences in the overall thickness of the slat material 10 due to the textured pattern are not sufficient to cause significant changes in light transmission. In this regard, it is noted that, in FIG. 1, the texture features are greatly exaggerated for clarity. On the other hand, the application of paint droplets preferentially on peaks and ridges of the texture pattern, in the manner of the present invention, significantly enhances the visibility of the texture pattern as illuminated by backlight, as light passing through the painted surfaces is attenuated. Differences in the tone or shade between the applied paint and the unpainted portions of the inner surface 11 can also cause such an application of paint droplets to enhance the visibility of the texture pattern as illuminated by interior front light.

Figure 3:
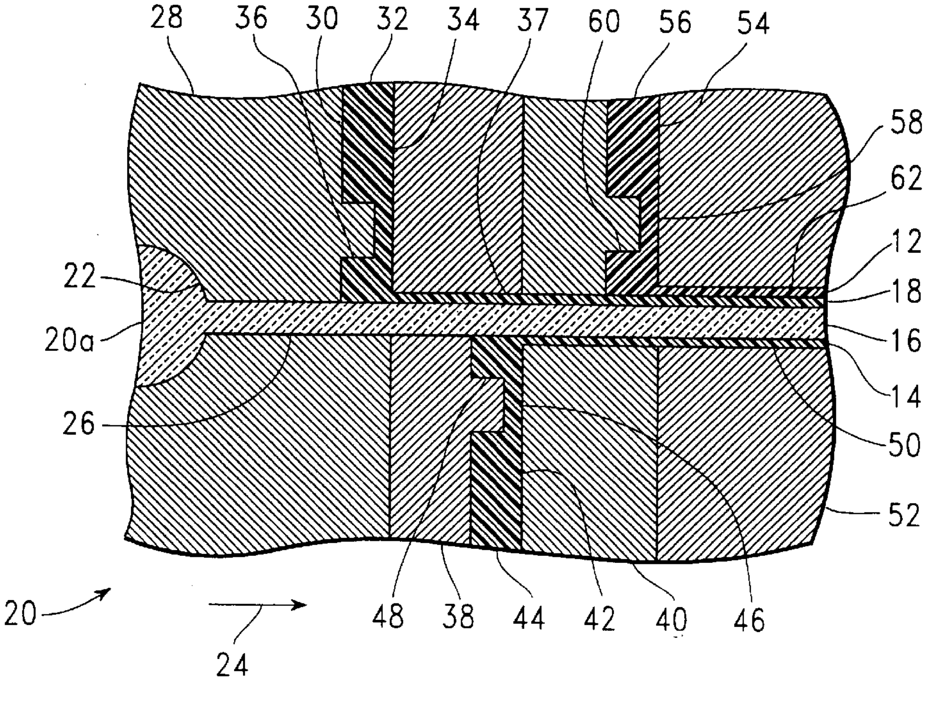
FIG. 3 is a fragmentary longitudinal cross-sectional view of a die set used in the extrusion of material for the slat of FIG. 1.

FIG. 3 is a longitudinal cross-sectional view of an extrusion die set 20 used in the production of the slat of FIG. 1. The first base layer 16 is formed first, with thermoplastic material 20*a* being forced from a cavity 22 in the direction of arrow 24 through a channel 26 in a first die 28. The first die 28 also includes an input channel 30 through which thermoplastic material 32 is inserted to form second base layer 18. The input channel 30 is connected by a narrowed channel 34 to a trough 36 extending along a portion of the periphery of channel 26 corresponding to the peripheral contact between the second base layer 18 and the first base layer 16. The shape of second layer 18 is determined by the shape of a channel surface 37 extending through a second die 38 and partially through a third die 40. Second die 38 also includes an input channel 42 through which thermoplastic material 44 is inserted to form outside layer 14. The input channel 42 is connected by a narrowed channel 46 to a trough 48 extending along a portion of the periphery of channel 26 corresponding to the peripheral contact between the first base layer 16 and the outside layer 14. The shape of outside layer 14 is further determined by the shape of a channel surface 50 extending through third die 40 and through a fourth die 52. The third die 40 also includes an input channel 54 through which thermoplastic material 56 is inserted to form inside layer 12. The input channel 54 is connected by a narrowed channel 58 to a trough 60 extending along a portion of the periphery of the second base layer 18 corresponding to the extent of peripheral contact between the second base layer 18 and the inside layer 12. The shape of inside layer 12 is further determined by a channel surface 62 extending through the fourth die 52.

Figure 4:
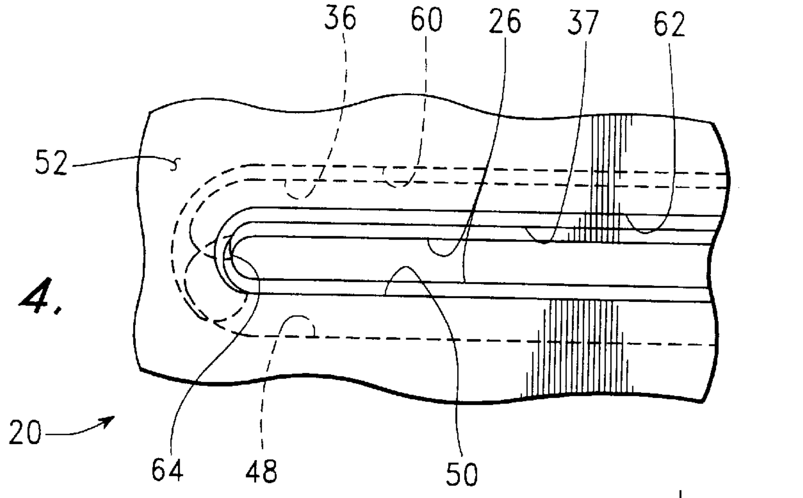
FIG. 4 is a fragmentary end elevational view of the die set of FIG. 3.

FIG. 4 is an end elevational view of the die set 20, as viewed in a direction opposite that of arrow 24 in FIG. 3. FIG. 4 shows an end of the die openings, within which a longitudinally extending rounded edge 18*d* of the slat 10 (shown in FIG. 1) is formed by coextrusion.

Referring to FIGS. 1 and 4, the channel surfaces 26, which determine the shape of first base layer 16, are formed in the shape of a slot with rounded ends 64, around which the channel surface 50, forming the shape of outside layer 14 partly extends. The trough 48, through which material is supplied to form the outside layer 14, also extends partly each slot end 64. The channel surface 37, which determines the shape of second base layer 18, also wraps partly around the slot ends 64. The channel surface 62, which determines the shape of inside layer 12 wraps around the end 64 outside the surfaces 37, 50. The trough 60, through which material is supplied to form the inside layer 12, also wraps around the end 64. In this way, the outer layers 12, 14, are formed to overlap and to encapsulate the inner layers 16, 18.

Figure 5:
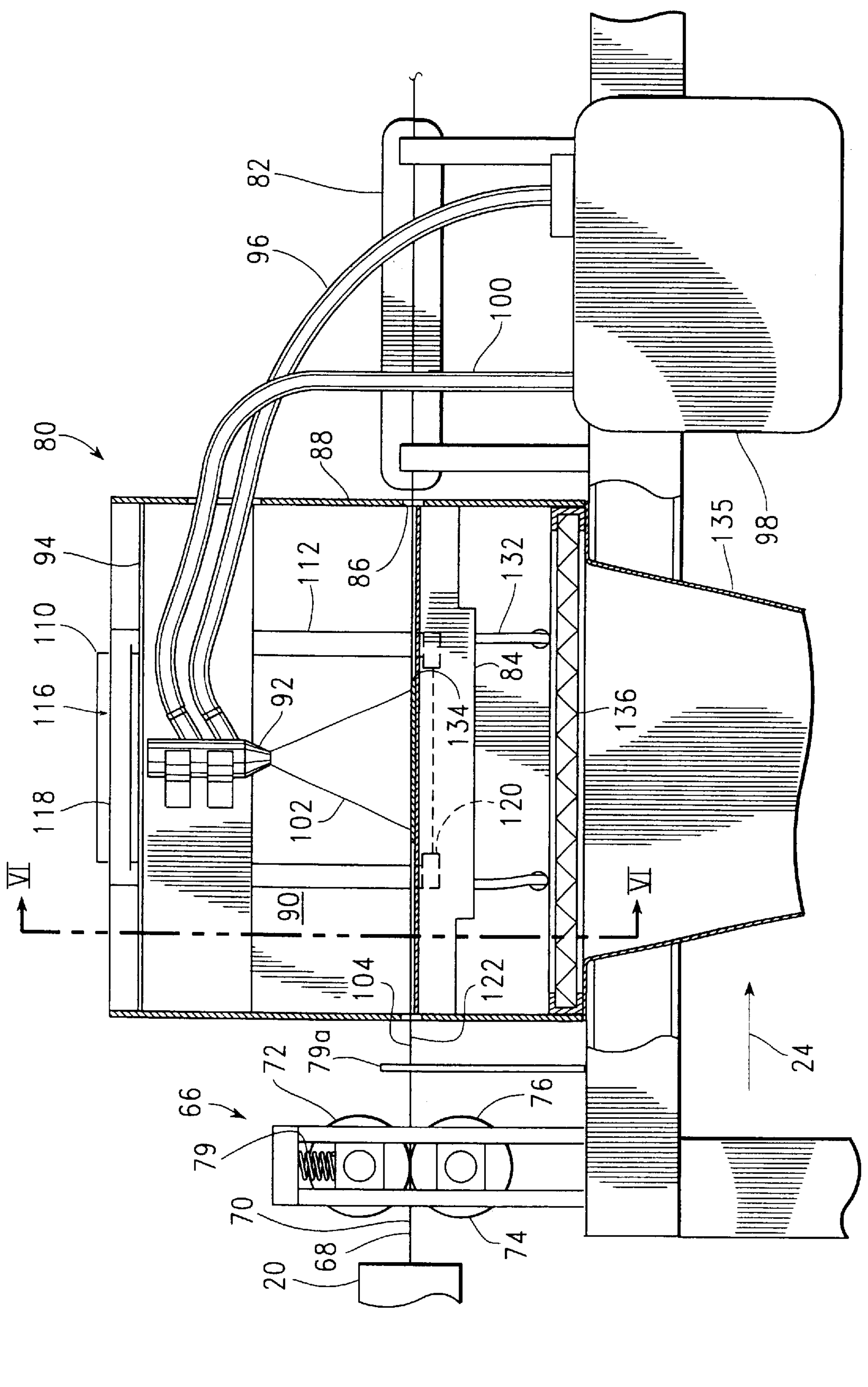
FIG. 5 is a partially sectional side elevation of texturing and painting stations used to form the surface pattern of FIG. 1 on a surface of the material being extruded from the die set of FIG. 3.

FIG. 5 is a side elevation of a texturing station 66 used to impart a texture pattern on an inside surface 68 of slat material 70 being extruded from the die set 20. This texturing station 66 includes a metal texturing roll 72 and a back-up roll 74 having a rubber coated peripheral surface 76. The peripheral surface 78 of the texturing roll has a pattern which is the inverse of the pattern to formed in the inside surface 68, with ridges in the peripheral surface 78 forming grooves in the slat material surface 68. The rolls 72, 74 are allowed to rotate freely with the motion of the slat material 70 in the direction of arrow 24, but are held in engagement with the slat material 70 by compression springs 79. After passing between the rolls 72, 74, the slat material 70 is pulled through an alignment fixture 79*a* having upstanding oblique surfaces at the edges of the slat material 70 for aligning this material 70, a painting station 80 and a cooling station 82 onto a conveyer belt (not shown), and is cut to a suitable length by a powered knife (not shown) moving with the slat material 70 during the cutting process. Within the painting station 80, heat from the extrusion process is used to dry the paint. Following the painting and drying, the slat material is cooled by cold water being pumped through the cooling station 82.

Referring again to FIGS. 1 and 3, the second base layer 18, which has been described above as being composed of a UV stabilized PVC material having pearlescent pigmentation, such as GEON No. 87654, is alternatively composed of a clear PVC material, such as GEON No. 87727-002. In this way, the second base layer 18 is used to provide a significant change in the percentage of light transmitted through the slat 10 without reformulating the plastic materials and without changing the die set 20. Experiments have shown, for example, that the percentage of light transmitted through a slat of this type having the second base layer 18 composed of a PVC with pearlescent pigmentation is approximately six percent, while the percentage of light transmitted through an otherwise similar slat having the first base layer 16 composed of a clear PVC is approximately twelve percent. While the use of four layers provides this advantage of the present invention, it is understood that a version of the present invention includes only three layers—an inside layer, and outside layer, and a transparent base layer.

The layered construction of the present invention further allows the use of a relatively thick base layer, which is transparent to preserve the overall translucency of the slat, while achieving an overall thickness sufficient to retain stiffness and strength within the slat.

While the second base layer 18 is described above as being composed of a clear transparent PVC, this layer 18 is alternately composed of a pigmented transparent PVC material to provide transmitted light having the color of the pigmented material. A slat made in this way retains its silver-white appearance when it is illuminated from inside, with light reflected from the slat, but changes its effective color to a muted version of second layer. A particularly attractive slat has been made in this manner using a red pigment within the second base layer 18.

Figure 6:
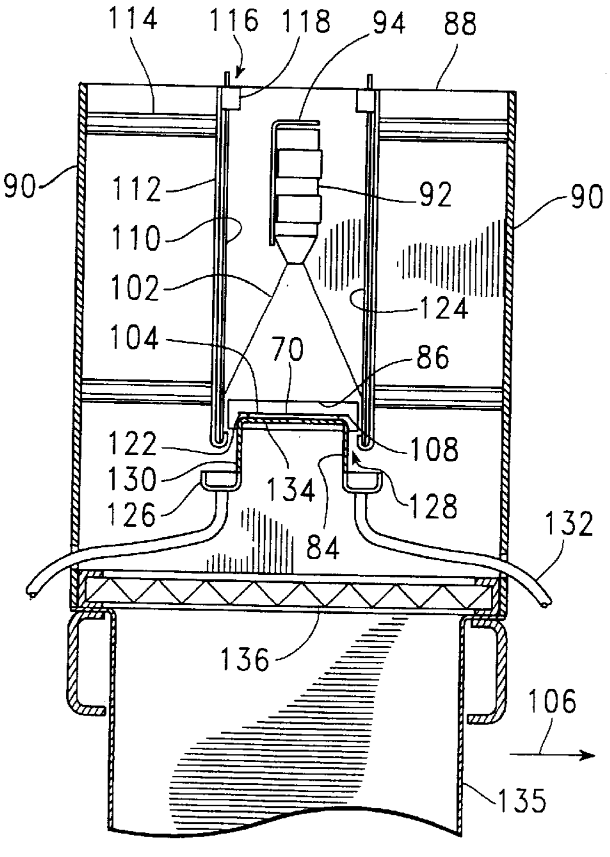
FIG. 6 is a transverse cross sectional view of the painting station of FIG. 5, taken as indicated by section lines VI—VI therein.

FIG. 6 is a transverse cross-sectional view of painting station 80, being taken as indicated by section lines VI—VI in FIG. 5.

Referring to FIGS. 5 and 6, within painting station 80, the slat material 70 is pulled along a longitudinally extending support channel 84 by the conveyer system (not shown), being moved through slots 86 in end covers 88. The painting station 80 also includes side covers 90, but is open at the top. A paint spray nozzle 92, held in place by a paint support bracket 94 extending between the end covers 88, is directed downward at the slat material 70 moving through the painting station 80. Paint is supplied to the nozzle 92 through a hose 96 from a paint supply container 98. To assure the proper flow of paint, the paint supply container 98 is preferably pressurized by means of a regulated air supply system (not shown). A second hose 100 carries compressed air to the paint spray nozzle 92. Within the spray nozzle 92, paint from hose 96 is atomized by air from hose 100, so that a mixture of air and paint droplets is sprayed downward in a generally conical pattern 102.

The painting station 80 is particularly configured to minimize variations in paint coverage along the top surface 104 of the slat material 70, in the transverse direction of arrow 106. Such variations, which are be caused by radial variations in the density of paint droplets within the conical pattern 102 and by the fact that the center of the top surface 104 passes under the conical pattern 102 for a longer time than the outer edges 108 of this surface 104, are minimized by configuring the painting station 80 so that the conical pattern 102 overextends the width of the slat material 80. Furthermore, a vertical renewable surface 110 is held adjacent to each edge of the causing the flow of air and paint to be deflected toward the top surface 104, increasing the density of paint near each outer edge 108, so that the painting process is more uniform in the transverse direction of arrow 106. Each renewable surface 110 is held in place within a vertical support plate 112, which is in turn held by a number of stand-offs 114 extending inward from the adjacent side cover 90. Each renewable surface 110, which may be composed of a sheet of cardboard, is inserted downward through a slot 116 formed by a lanced and formed strip 118 extending along the top edge of each vertical support plate 112, to be held by a pair of hook tabs 120 extending at the bottom of the vertical support plate 112.

The painting station 80 is also configured to prevent overspray paint damage to the undersurface 122 of the slat material 70. The passage of air under the slat material 70 is prevented by the support channel 84. Otherwise, air movement under the slat material 70 could carry paint droplets into contact with the undersurface 122.

Furthermore, the painting station 80 is configured for the removal of paint in solid or liquid forms without allowing damage to occur to the slat material 70 from such paint. After an excessive amount of paint is deposited on the inner sides 124 of the renewable surfaces 110 by direct contact with the paint spray pattern 102, these renewable surfaces 110 are removed and reversed to present new sides or replaced. During the painting process, paint runs or drips from the inner sides 124 of the renewable surfaces 110 into gutters 126 extending along the support channel 84. The retaining hooks 120 do not interfere in this flow of paint since they are spread apart along each vertical support plate 112 far enough to lie on either side of the paint spray pattern 102. The paint spray pattern 102 also extends downward through a slot 128 between each renewable surface 110 and the support channel 84, causing the deposition of paint on the vertical surfaces 130 of support channel 84. This paint drips downward into the gutters 126 extending below these vertical surfaces 130. Paint accumulated in the gutters 126 flows away from the painting station 80 through drain hoses 132. A spacing plate 134 holds the undersurface 122 of the slat material 70 in a spaced-apart relationship with the support channel 84 within the portion of the painting station 80 in which the paint spraying process occurs. In this way, the transfer of paint from the support channel 84 to the undersurface 122 is prevented. The slat material 70 overextends the spacing plate 134 so that the undersurface 122 does not contact any portion of the spacing plate 134 which is not covered by the slat 70, either. A cul de sac is thus formed at either side of the spacing plate, with a mixture of air and paint droplets being pulled through the slot 128 instead of being driven against the exposed portion of the undersurface 122.

A downward flow of air through the painting station 80 is maintained by means of an exhaust duct 135 pulling air away from the painting station 80 through a filter 136, which minimizes the flow of paint into the duct 135.

The preferential placement of paint droplets on peaks and ridges of the textured surface is an observed phenomenon that is believed to be caused by a combination of the principles described below in reference to FIGS. 7 and 8. Operation in accordance with these principles is understood not to be necessary for patentability.

Figure 7:
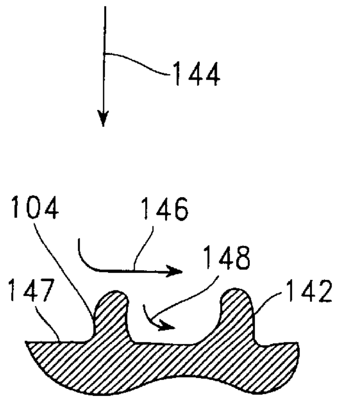
FIG. 7 is an enlarged sectional view of the textured upper surface of the slat of FIG. 1, with this surface including a number of upstanding peaks.

FIG. 7 is an enlarged sectional view of the textured upper surface 104 having a number of upstanding peaks 142. The air and paint mixture from the nozzle 92 (shown in FIG. 6) is directed downward, as indicated by arrow 144. However, since the air cannot move through the upper surface 104, it must flow horizontally outward, as indicated by arrow 146. When paint entrained within the air flow comes into contact with the surface 104, it generally is transferred to the surface 104. This process occurs first at the tips of upstanding peaks 142. The outward rate of airflow near flat or depressed portions 147 of the surface, as indicated by arrow 148, is at much lower velocities than the airflow near the peaks, as indicted by arrow 146. Since this airflow carries paint, the tips of peaks 148, upon which more air impinges at a faster rate, are coated with much more paint.

Figure 8:
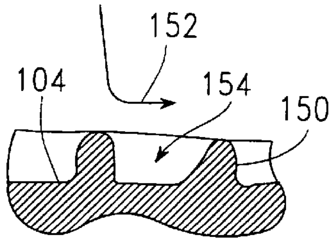
FIG. 8 is an alternate enlarged sectional view of the textured upper surface of the slat of FIG. 1, with this surface including a number of upstanding ridges.

FIG. 8 is an enlarged sectional view of the textured upper surface 104 having a number of upstanding ridges 150. The air flows outward above the ridges, as indicated by arrow 152, with generally stagnate air conditions being maintained in the regions 154 between ridges 150. Thus, relatively little paint is deposited between the ridges 150.

Furthermore, the electrostatic forces between paint droplets and the upper surface 104 may be responsible for preferential attraction of the paint droplets to the points and ridges of the texture pattern. In the process of mixing and atomization occurring within the spray nozzle 94, triboelectric charging occurs between the paint droplets and the air in which they are carried, causing electrostatic charges to be placed on the droplets. Also, electrostatic charges are placed in the surfaces of the upper surface 104 during the processes of extrusion and of rolling to produce the desired texture. Since the upper surface 104 is not flat, the electrostatic field above it is not uniform. Fringing fields are directed toward the tips of raised features, causing the charged paint droplets to be placed preferentially on such tips.

Since such effects can be overcome by depositing enough paint that paint is deposited on all portions of the upper surface 104, the deposition of paint must be controlled to achieve the particular visual result desired. A metallic clear water-based paint may be used, or the paint may have a matte or pearlizing pigment. Good results have been obtained using a high-volume, low-pressure nozzle with a 0.5 mm (0.02 in.) diameter orifice about 30 cm (12 in.) above the upper surface 104, with a pressure measured at the nozzle tip of 3 to 6 psi. The painting process also is dependent on the temperature of the surface being painted. Good results have been obtained with the paint nozzle 92 being displaced horizontally, in the direction of arrow 24 from the texturing rollers 72, 74, through a distance of about 76 cm (30 in.), with the temperature of the surface 104 being about 300 degrees F.

Figure 9:
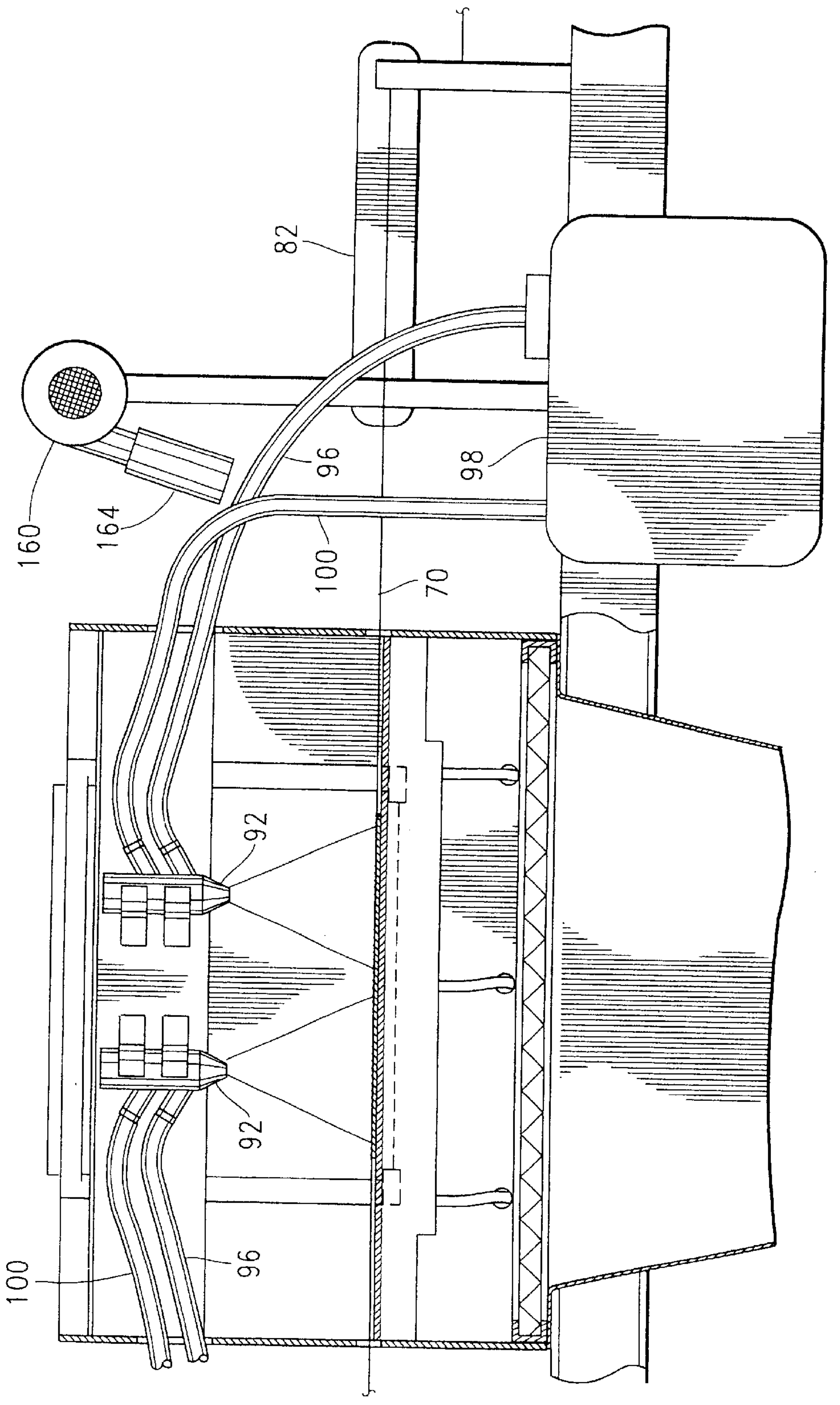
FIG. 9 is a partially sectional side elevation of an alternate painting station used to paint the surface pattern of FIG. 1 on a surface of the material being extruded from the die set of FIG. 3.

FIG. 9 is a partially sectional side elevation of an alternate painting station 160 used to paint the surface pattern of FIG. 1 on a surface of the slat material 70 following extrusion through the dies set 20 of FIG. 3 and texturing within the texturing station 66 of FIG. 5. In comparison with the painting station 80, described above in reference to FIG. 5, this alternate painting station 160 is elongated to include two spray painting nozzles 92. Each nozzle 92 is connected to its own paint supply container 98 by a hose 96 and to an air supply (not shown) by means of a hose 100. The two nozzles 92 are aligned longitudinally along the slat material 70 being painted. Other features of the alternate painting station 160 are generally as described above in reference to FIGS. 5 and 6.

This alternative painting station 160 is used to deposit a more even layer of paint on the surface of the slat material 70, eliminating some of the splattered appearance of paint deposited through the use of the painting station 80 of FIG. 5. Even with the alternative painting station 160, paint is preferentially applied to peaks and ridges of the texture pattern, so that the effects described above are retained. Different visual effects can also be achieved by spraying different colors or types of paint through the two nozzles 92. Experiments have shown that, in this painting station 160, more paint is being applied, so that external heating is required to dry the paint as required for handling through the apparatus. Thus, a separate blowing heater 164 is added, being directed at the slat material 70 between the painting station 160 and the cooling station 82.

Figure 10:
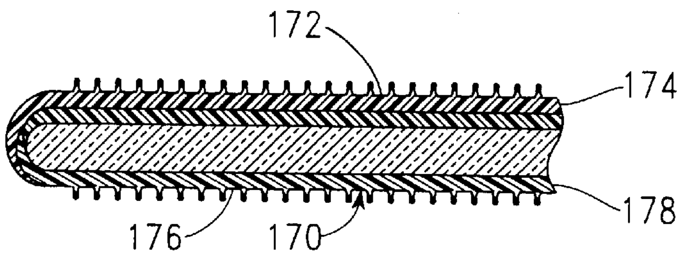
FIG. 10 is a fragmentary transverse cross-sectional view of a translucent slat made in accordance with a second embodiment of the present invention to include a selectively painted textured surface on each side.

FIG. 10 is a fragmentary transverse cross-sectional view of a slat 170, made in accordance with a second embodiment of the present invention, to include a selectively painted inner surface 172 on an innermost layer 174 of a number of coextruded layers, and a selectively painted outer surface 176 on an outermost layer 178 of the coextruded layers.

Figure 11:
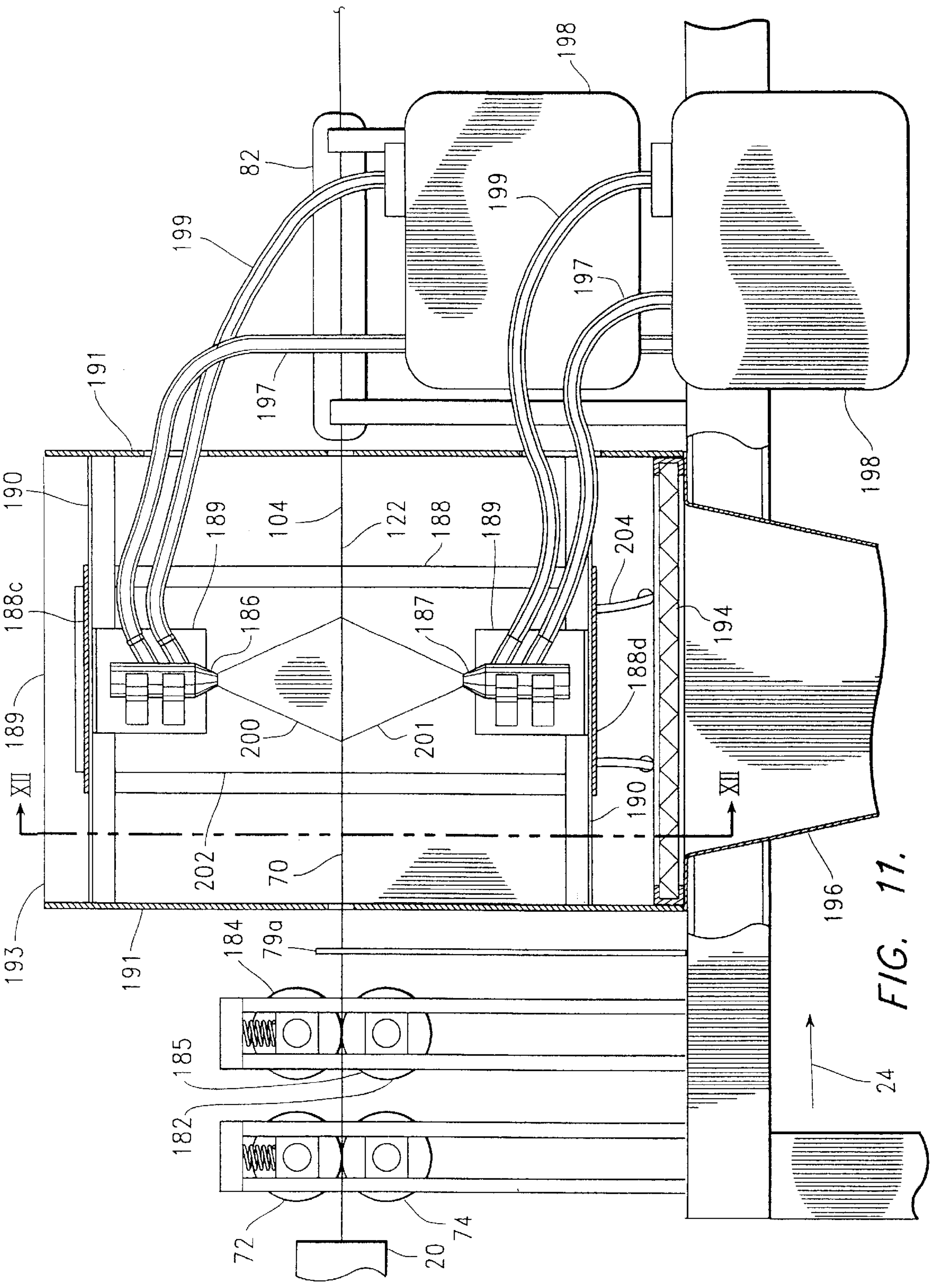
FIG. 11 is a partially sectional side elevation of texturing and painting stations used to form the surface patterns of FIG. 8 on both surfaces of the material being extruded from the die set of FIG. 3.

FIG. 11 is a partially sectional side elevation of a texturing station 180 and a painting station 181 used to form the surface patterns of FIG. 10 on both surfaces of the slat material 70 being extruded from the die set 20 of FIG. 3. The texturing station 180 includes a first texturing roll 72 and a first back-up roll 74, used as described above in reference to FIG. 5, to place a textured image on the upper surface 104 of the slat material 70, together with a second texturing roll 182 and a second back-up roll 184. The second texturing roll 182 has a peripheral surface 185 forming the textured surface on the lower surface 122 of the slat material 70. The textured pattern being placed on the lower surface 122 may be the same as, or different from, the textured pattern placed on the upper surface 104.

Figure 12:
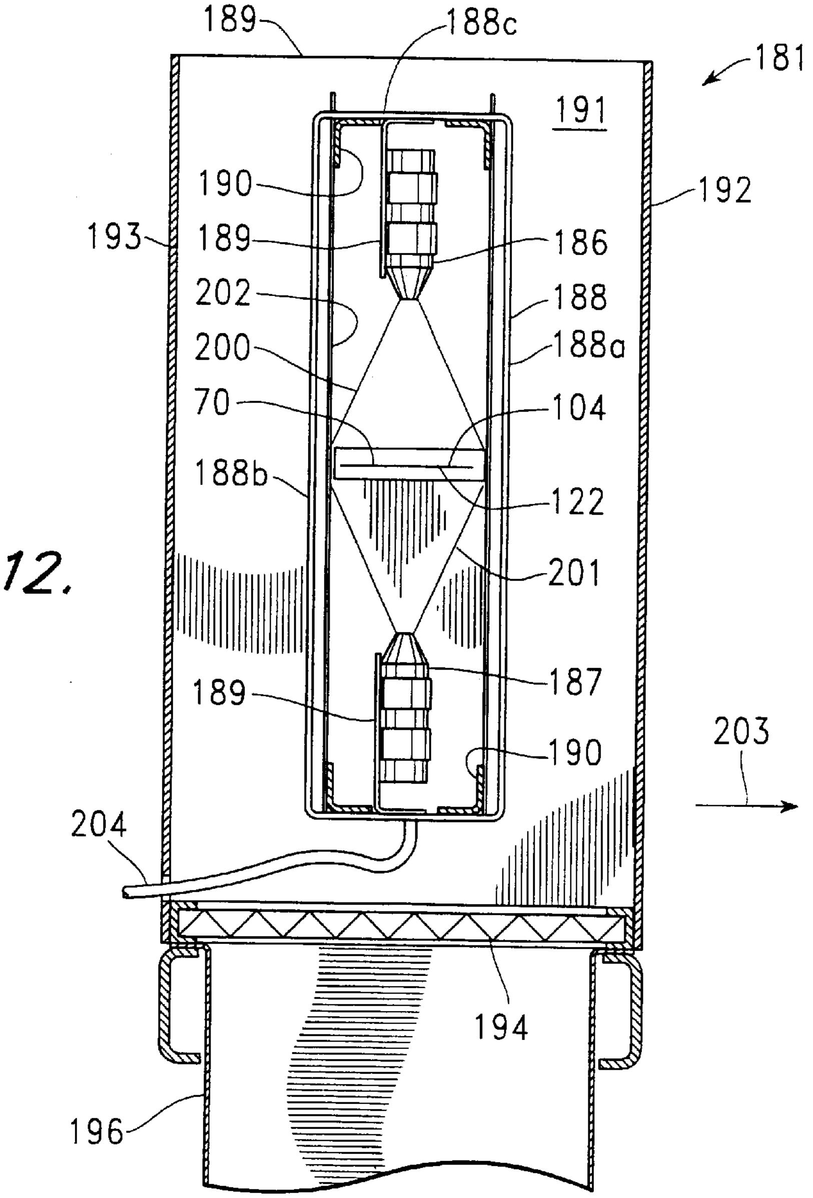
FIG. 12 is a transverse cross-sectional view of the painting station of FIG. 9, taken as indicated by sections lines XII—XII therein.

FIG. 12 is a transverse cross-sectional view of the painting station 181, taken as indicated by section lines XII—XII in FIG. 11.

Referring to FIGS. 11 and 12, the painting station 181 includes an upper paint spray nozzle 186 directed downward at the upper surface 104 of the slat material 70 moving through this station 181 and a lower paint spray nozzle 187 directed upward at the lower surface 122 thereof. Each of these nozzles 186, 187 is attached within an inner structure 188 by means of a nozzle attachment bracket 189. The inner structure 188 is closed at a front side **188*a*, at a rear side 188*b*, at a top side 188*c*, and at a bottom side 188*d*, being open at the ends. The inner structure 188 is fastened within an outer structure 189 by means of four angle brackets 190, which extend between the end covers 191 of the outer structure 190. The outer structure 190, which also includes a front cover 192 and a rear cover 193 is open at the top and includes a filter 194 extending across the bottom, where an exhaust duct 196 keeps air moving downward through the outer structure 190. Each nozzle 186, 187 is supplied with air under pressure through a hose 197 and with paint from a supply container 198 through a hose 199**.

In the general manner previously described in reference to painting station 80 of FIGS. 5 and 6, the spray patterns 200, 201 from nozzles 186, 187, respectively, overextend the slat material 70, with portions of the flow of air and paint being redirected by renewable surfaces 202, in order to provide more uniform paint coverage across the width of the slat material 70, in the transverse direction of arrow 203. Most of the paint deposited on the renewable surfaces 202 runs downward, to the bottom side **188*d* of inner structure 188. From this area, paint is carried outside the painting station 181 through a hose 204. When an excessive build-up of paint occurs on the renewable surfaces 202, they are removed and reversed or replaced, being removed and inserted through slots 203 in the upper side 188*c* of inner structure 188**.

The effect of overspray from upper nozzle 186 reaching lower surface 122 of slat material 70, or of overspray from lower nozzle 187 reaching upper surface 104 thereof, is minimized by placing the nozzles 186, 187 in alignment with one another on opposite sides of the slat material 70. Since air pressure is introduced from opposite sides of the slat material 70, there is relatively little air flow around the ends of the slat material 70, adjacent the renewable surfaces 202. Nevertheless, this embodiment of the present invention is understood to include a paint spray station of this general type, having nozzles on opposite sides of the slat material 70, which are displaced from one another in the longitudinal direction of arrow 24.

The presence of surfaces contacting the slat material 70 within the paint spray station 181 is particularly avoided within the painting station 181, since contact with such surfaces could otherwise smear the paint present on both sides of the slat material 70. Thus, the slat material 70 travels unsupported between the alignment fixture 79*a* and the cooling station 82, a distance of about 91 cm (36 in.). Tension is maintained within the slat material 70 by pulling this material with a conveyer belt (not shown) and rollers (not shown) engaging the slat material 70 beyond the cooling station 82.

While pairs of paint spray nozzles have been described in detail as being located in a longitudinally displaced relationship on the same side of the slat material 70 and alternately in an opposed relationship on opposite sides of the slat material 70, the present invention is understood to include the use of additional nozzles, such as a first pair of nozzles on a first side of the slat material 70 and a second pair of nozzles on a second side of the slat material, opposite the first side thereof.

FIG. 13 is a front elevation of a vertical blind assembly having a number of the slats 210 hanging from a track system 212, which is of a conventional type well know to those skilled in the art of window and door coverings. Each slat 210 is of a type described above, either in reference to FIG. 1 or FIG. 10 Each slat 210 includes an aperture by which it is held on a slat holder (not shown) within the track system 212.

FIG. 14 is a fragmentary plan view of the vertical blind assembly of FIG. 13, taken as indicated by section lines XIV—XIV in FIG. 13 to show three slats 210. Each slat 210 has an inside surface 214, which has, for example, a textured surface formed as described above in reference to FIG. 5. The transverse sectional shape of the slat 210 is further characterized by a curvature of the inside surface 214, such as a convex or "S"-shaped curvature, into which the slat material 70 (shown in FIG. 5) is formed following the extrusion process, while the material is still warm.

While FIG. 14 shows each slat having a textured surface on only one side, it is understood that the slats may also be of the type described above in reference to FIG. 10, having textured surfaces on both sides.

Referring to FIGS. 13 and 14, the track system 212 causes the slats 210 to rotate in unison about vertical axes between an open position in which the slats 210 are essentially parallel and a closed position, in which the slats 210 cooperate to cover the window or door (not shown) behind them. In this closed position, the slats 210 are preferably oriented so that their inside surfaces 214 face into the room in which the blind assembly is mounted. The track system 212 also causes the slats 210 to move toward one another and away from one another.

FIG. 15 is a cross-sectional end elevation of a horizontal blind assembly including a number of slats 216. In the rotated-open position shown, each slat 216 rests, with its inside surface 218 facing upward, on a pair of transverse support cords 220 extending within a tilt cord loop 222. The slats 216 are rotated in unison and lifted to form a stack from the bottom by means of a blind mechanism 223, which is of a type well known to those skilled in the art of window coverings. The slats 216 are preferably rotated from the open position shown by moving an inside side 224 of the cord loop 222 downward while an outside side 226 of the cord loop is moved upward, so that the inside surfaces 218 of the slats 216 are exposed within the room in which the blind assembly is mounted. A lifting bar 228 is raised by means of two or more lifting cords 230 to raise the slats 216 in a stack formed from the bottom.

While the present invention has been described above in terms of the application of paint to translucent slat material, to achieve a particular advantage when the slat material is backlighted by sunshine during the day, it is understood that the processes described above are also applied to opaque slat material, forming a texture pattern which is more readily visible due to differences in color or shade between the paint and the opaque material of the slat.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for producing a visibly enhanced textured surface on slat material extruded to form a slat for a blind assembly, wherein said apparatus comprises:

a texturing station through which said slat material is moved, wherein said texturing station includes a first texturing roll turning in contact with a first surface of said slat material and a first back-up roll turning in contact with a second surface of said slat material, said second surface being opposite said first surface, with a peripheral surface of said first texturing roll having a surface pattern forming, on said first surface of said slat material, a texture pattern having raised areas and adjacent lower areas; and a painting station through which said slat material is moved after being moved through said texturing station, wherein said painting station includes a first nozzle spraying a mixture of air and paint droplets onto said first side of said slat material in a painting process configured to apply a substantially thicker coating of paint to said raised areas than to said adjacent lower areas, and wherein said texturing station and said painting station are sufficiently close to a die through which said extruded slat material is extruded that said extruded slat material is hot enough to dry said paint within said painting station.

2. The apparatus of claim 1, wherein said painting station includes a support structure extending longitudinally adjacent said second surface of said slat material, blocking movement of air thereby.

3. The apparatus of claim 2, wherein said support structure includes a guiding surface on which a central portion of said second surface of said slat material slides, with both edges of said slat material extending past said guiding surface.

4. Apparatus for producing a visibly enhanced textured surface on slat material extruded to form a slat for a blind assembly, wherein said apparatus comprises:

a texturing station through which said slat material is moved, wherein said texturing station includes a first texturing roll turning in contact with a first surface of said slat material and a first back-up roll turning in contact with a second surface of said slat material, said second surface being opposite said first surface, with a peripheral surface of said first texturing roll having a surface pattern forming, on said first surface of said slat material, a texture pattern having raised areas and adjacent lower areas; and a painting station through which said slat material is moved after being moved through said texturing station, wherein said painting station includes a first nozzle spraying a mixture of air and paint droplets onto said first side of said slat material in a painting process configured to apply a substantially thicker coating of paint to said raised areas than to said adjacent lower areas, and wherein said painting station includes a renewable surface extending within a spray pattern of said nozzle, perpendicular to said first surface, and in a spaced apart relationship an edge of said slat material moving through said painting station.

5. Apparatus for producing a visibly enhanced textured surface on slat material extruded to form a slat for a blind assembly, wherein said apparatus comprises:

a texturing station through which said slat material is moved, wherein said texturing station includes a first texturing roll turning in contact with a first surface of said slat material and a first back-up roll turning in contact with a second surface of said slat material, said second surface being opposite said first surface, with a peripheral surface of said first texturing roll having a surface pattern forming, on said first surface of said slat material, a texture pattern having raised areas and adjacent lower areas; and a painting station through which said slat material is moved after being moved through said texturing station, wherein said painting station includes a first nozzle spraying a mixture of air and paint droplets onto said first side of said slat material in a painting process configured to apply a substantially thicker coating of paint to said raised areas than to said adjacent lower areas, wherein said first nozzle has an orifice with a diameter of 0.5 mm, said first nozzle is placed approximately 30 cm away from said first surface of said slat material, and said first nozzle is operated at a tip pressure of 3 to 6 psi.

6. The apparatus of claim 1, wherein said raised areas of said texture pattern formed on said first surface of said slat material substantially extend along a first outer plane, said lower areas of said texture pattern formed on said first surface of said slat material include substantial portions extending along a first inner plane displaced from said first outer plane, and said painting process is configured to apply a substantially thicker coating of paint to said raised areas that to said substantial portions of said lower areas of said texture pattern formed on said first surface of said slat material.

7. Apparatus for producing a visibly enhanced textured surface on slat material extruded to form a slat for a blind assembly, wherein said apparatus comprises:

a texturing station through which said slat material is moved, wherein said texturing station includes a first texturing roll turning in contact with a first surface of said slat material and a first back-up roll turning in contact with a second surface of said slat material, said second surface being opposite said first surface, with a peripheral surface of said first texturing roll having a surface pattern forming, on said first surface of said slat material, a texture pattern having raised areas and adjacent lower areas, wherein said texturing station additionally includes second texturing roll turning in contact with said second side of said slat material and a second back up roller turning in contact with said with first side of said slat material, with a peripheral surface of said second texturing roll having a surface pattern forming, on said second surface of said slat material, a texture pattern having raised areas and adjacent lower areas; and a painting station through which said slat material is moved after being moved through said texturing station, wherein said painting station includes a first nozzle spraying a mixture of air and paint droplets onto said first side of said slat material in a painting process configured to apply a substantially thicker coating of paint to said raised areas than to said adjacent lower areas, and wherein said painting station additionally includes a second nozzle spraying a mixture of air and paint droplets onto said second side to said slat material in a painting process configured to apply a substantially thicker coating of paint to said raised areas than to said adjacent lower areas.

8. The apparatus of claim 7, wherein said raised areas of said texture pattern formed on said first surface of said slat material substantially extend along a first outer plane, said lower areas of said texture pattern formed on said first surface of said slat material include substantial portions extending along a first inner plane displaced from said first outer plane, said painting process is configured to apply a substantially thicker coating of paint to said raised areas that to said substantial portions of said lower areas of said texture pattern formed on said first surface of said slat material, said raised areas of said texture pattern formed on said second surface of said slat material substantially extend along a second outer plane, said lower areas of said texture pattern formed on said second surface of said slat material include substantial portions extending along a second inner plane displaced from said second outer plane, and said painting process is configured to apply a substantially thicker coating of paint to said raised areas that to said substantial portions of said lower areas of said texture pattern formed on said second surface of said slat material.

* * * * *